Feb. 11, 1930.　　　O. LEUCHS　　　1,746,663
PROCESS FOR THE ETHERIFICATION OF CARBOHYDRATES
Filed June 1, 1927
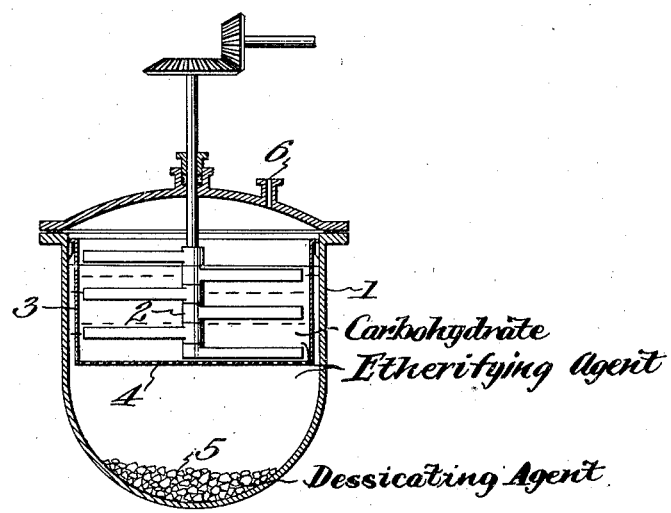
Inventor:
Otto Leuchs,
By Byron Townsend Brickenstein,
Attorneys Patented Feb. 11, 1930

1,746,663

UNITED STATES PATENT OFFICE

OTTO LEUCHS, OF ELBERFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS FOR THE ETHERIFICATION OF CARBOHYDRATES

Application filed June 1, 1927, Serial No. 195,756, and in Germany June 1, 1926.

This invention relates to a process for the etherification of carbohydrates.

Heretofore it has been considered necessary to conduct the etherification of carbohydrates (such as, for example, sugars, starches, dextrin, cellulose in the form of loose alkali-cellulose, etc.) in two separate stages; i. e., the carbohydrate first was desiccated and afterwards etherified in a second operation. Such procedure not only involves the use of a plurality of pieces of apparatus but also is fraught with complications.

It has now been found that the etherification of carbohydrates may be effected in a most simple manner, with improved results, and in a unitary apparatus by subjecting the carbohydrates to a combined desiccating and etherifying treatment at reacting temperatures. This combined treatment is effected in a suitable apparatus which may consist generally of an autoclave or the like,—for instance, a stirring kettle,—combined with a desiccator in such manner that the etherification may be effected, with or without stirring, in the presence of an agent adapted for simultaneous absorption of water.

For a full understanding of the invention, reference is had to the accompanying drawing which represents by way of example a preferred form of apparatus embodying the invention and suitable for carrying out the process thereof.

In the accompanying drawing 1 represents a conventional form of autoclave provided with a suitable form of stirring device 2. In the upper part of the autoclave 1 there is suspended a perforate receptacle, for example, a basket 3, enclosing the stirrer 2, provided with a perforated bottom 4, in which receptacle is disposed the carbohydrate (e. g., sugar, starch, dextrin, alkali-cellulose or the like) to be etherified. The lower part of the autoclave 1 is filled wholly or in part with appropriate desiccating means 5, such as for example fragments of fused calcium chloride. 6 conventionally represents means for the ingress and/or egress of fluids (such as, for example, etherifying fluids) into or out of the autoclave.

The operation readily will be understood from the foregoing description. The perforate receptacle 3 is charged with the carbohydrates and an effective amount of the necessary etherifying agent (e. g., ethyl chloride, ethyl bromide, methyl chloride, or the like) is introduced into the autoclave 1, preferably with agitation of the carbohydrate charge. The simultaneous etherification of the carbohydrate and desiccation of the reaction components result, aided when necessary, by the application of heat in any conventional manner. The calcium chloride or other desiccating agent absorbs water from the starting materials and from the reaction products substantially simultaneously with its formation.

It will be obvious that the process above described is not limited in its applicability to the introduction of alkyl groups (e. g., methyl or ethyl groups) into the carbohydrate molecule; it is equally applicable to the introduction of aralkyl or aryl groups.

I claim:

1. In the process for the etherification of carbohydrates involving the treatment of the carbohydrates at reacting temperatures with an etherifying agent, the step which consists in carrying out the etherification in the presence of a desiccating agent maintained out of physical contact with the carbohydrate.

2. In the process for the etherification of carbohydrates involving the treatment of the carbohydrates at reacting temperatures with an etherifying agent, the step which consists in carrying out the etherification in the presence of fused calcium chloride.

In testimony whereof, I affix my signature.

OTTO LEUCHS.